US012442041B2

(12) United States Patent
Ryu et al.

(10) Patent No.: US 12,442,041 B2
(45) Date of Patent: *Oct. 14, 2025

(54) EPIGENETIC BIOMARKER COMPOSITION FOR DIAGNOSING DOWN SYNDROME, AND USE THEREOF

(71) Applicant: SUNGKWANG MEDICAL FOUNDATION, Seoul (KR)

(72) Inventors: Hyun Mee Ryu, Seongnam-si (KR); Ji Hyae Lim, Seongnam-si (KR)

(73) Assignee: SUNGKWANG MEDICAL FOUNDATION, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/003,658

(22) PCT Filed: May 7, 2021

(86) PCT No.: PCT/KR2021/005716
§ 371 (c)(1),
(2) Date: Dec. 28, 2022

(87) PCT Pub. No.: WO2022/005009
PCT Pub. Date: Jan. 6, 2022

(65) Prior Publication Data
US 2024/0026451 A1    Jan. 25, 2024

(30) Foreign Application Priority Data
Jul. 2, 2020 (KR) .................. 10-2020-0081684

(51) Int. Cl.
C12Q 1/6883   (2018.01)
C12Q 1/6806   (2018.01)
C12Q 1/6874   (2018.01)

(52) U.S. Cl.
CPC ......... *C12Q 1/6883* (2013.01); *C12Q 1/6874* (2013.01); *C12Q 1/6806* (2013.01); *C12Q 2600/154* (2013.01)

(58) Field of Classification Search
None
See application file for complete search history.

(56) References Cited

U.S. PATENT DOCUMENTS

2017/0226570 A1* 8/2017 Weksberg ............ C12Q 1/6827

FOREIGN PATENT DOCUMENTS

KR  10-2019-0003987 A  1/2019
KR  10-2019-0089552 A  7/2019
WO  WO 2017/190215 A1  11/2017

OTHER PUBLICATIONS

Lim (Clincial Epigenetics 12/42019 11:180).*
Lim ("Epigenome-wide base-resolution profiling of DNA methylation in chorionic villi of Down Syndrome fetuses by methyl-capture sequencing", PhD Thesis, Feb. 2019, 61 pages).*
Lim (Clinical Epigenetics Dec. 4, 2019 11:180 pp. 1-11).*
Ensembl sequence for the SHROOM1 gene (ENSG00000164403) accessed online Feb. 8, 2024.*
Ahern (The Scientist, vol. 9 #15 Jul. 24, 1995).*
Pandey (Clinical Epigenetics 2016 8: 101 pp. 1-10).*
FischerScientific Catalog (Applied Biosystems SYBR Green Universal Master Mix Catalog 43-091-55 viewed online https://www.fishersci.com/shop/products/applied-biosystems-sybr-green-pcr-master-mix-6/4309155 on May 22, 2024).*
Henneman (PLOS One 2018 13(3) e0194938).*
Chiu (Biochem J 2003 vol. 374 pp. 625-632).*
Japanese Office Action issued Oct. 17, 2023 in Japanese Application No. 2022-581672, (with unedited computer-generated English translation), 8 pages.
Zhang, Rong et al., "Application of Differentially Methylated Loci in Clinical Diagnosis of Trisomy 21 Syndrome", Genetic Testing and Molecular Biomarkers, vol. 23, No. 4, 2019, pp. 246-250.
Lim, Ji Hyae et al., "Non-Invasive Epigenetic Detection of Fetal Trisomy 21 in First Trimester Maternal Plasma", PLoS One, vol. 6, Issue 11, 2011, pp. 1-8.
Tong, Yu K. et al., "Epigenetic-Genetic Chromosome Dosage Approach for Fetal Trisomy 21 Detection Using an Autosomal Genetic Reference Marker", PLoS One, vol. 5, Issue 12, 2010, pp. 1-9.
International Search Report issued Oct. 5, 2021 in PCT/KR2021/005716, filed on May 7, 2021, 4 pages.
Korean Office Action issued Jul. 1, 2021 in KR 10-2020-0081684 (with English Translation), 9 pages.
Korean Written Decision on Registration issued Nov. 8, 2021 in KR 10-2020-0081684 (with English Translation), 7 pages.
Jin et al. "Global DNA Hypermethylation in Down Syndrome Placenta", PLOS Genetics, vol. 9, Issue 6, Jun. 2013, 10 pages.
Kerkel et al "Altered DNA Methylation in Leukocytes with Trisomy 21", PLOS Genetics, vol. 6, Issue 11, Nov. 2010, 14 pages.
Lim et al. "Epigenome-wide base-resolution profiling of DNA methylation in chorionic villi of fetuses with Down syndrome by methylcapture sequencing", Clinical Epigenetics, 2019, 12 pages.
OLD "Candidate epigenetic biomarkers for noninvasive prenatal diagnosis of Down syndrome", RMB Online, vol. 15, No. 2, 2007, 10 pages.

(Continued)

*Primary Examiner* — Amanda Haney
(74) *Attorney, Agent, or Firm* — Oblon, McClelland, Maier & Neustadt, L.L.P.

(57) ABSTRACT

Provided are a composition for diagnosing Down syndrome, a kit including the composition, a diagnostic method, and a method of providing information for diagnosing Down syndrome, the composition including an agent for measuring a methylation level of any one gene selected from the group consisting of MXRA8, MIB2, KIF26B, SP5, ZIC4, ENPEP, PITX2, SH3BP2, SEPP1, FLJ32255, SHROOM1, LINC00574, LOC154449, PRRT4, TMEM176B, MNX1, LOC101928483, EGFL7, NACC2, C9orf69, TLX1, FGF8, TACC2, CPXM2, NKX6-2, TLXINB, IQSEC3, PCDH8, F7, SOX9, PNMAL2, THBD, MAPK81P2, KLHDC7B, GPR143, IGHMBP2, MRGPRD, CHODL, NCAM2, CYYR1, GRIK1, OLIG2, CLIC6, SIM2, HLCS, MX2, MX1, TMPRSS2, SLC37A1, PDE9A, CBS, CRYAA, C21orf2, TRPM2, TSPEAR, LINC00162, SSR4P1, SLC19A1, LOC100129027, MCM3AP, YBEY, PRMT2, and ITSN1. Thus, Down syndrome can be diagnosed early with high accuracy, and the disclosure is expected to be applied as key a technology in the field of Down syndrome diagnosis.

1 Claim, 2 Drawing Sheets

(56) References Cited

OTHER PUBLICATIONS

Du et al. "Hypomethylated DSCR4 is a placenta-derived epigenetic marker for trisomy 21", Prenatal Diagnosis, vol. 31, 2011, 8 pages.
Partial Supplementary European Search Report issued Feb. 15, 2024 in European Patent Application No. 21832194.1, 19 pages.

* cited by examiner

EPIGENETIC BIOMARKER COMPOSITION FOR DIAGNOSING DOWN SYNDROME, AND USE THEREOF

TECHNICAL FIELD

The present disclosure relates to a biomarker composition for diagnosing Down syndrome, and a use thereof.

BACKGROUND ART

Mutations resulting from structural abnormalities in chromosomes result in abnormal development and death of embryos. However, in the case of Down syndrome (DS), a type of disease caused by the most common chromosomal abnormality, the embryo survives. According to the World Health Organization (WHO), Down syndrome, the most common genetic cause of developmental disabilities, has an estimated prevalence of 1 to 100 in 1,100 worldwide. Down syndrome exhibits more than 80 clinical features, including mental retardation, facial features, poor muscle development, and short stature, and is related to an increased risk of congenital heart disease, diabetes, leukemia, and other diseases.

A technique in the art for diagnosing Down syndrome is a method of analyzing the quantitative difference of cfDNA, a non-cellular DNA fragment present in plasma of pregnant women (next generation sequencing (NGS)-based non-invasive prenatal testing (NIPT)). This method shows high detection accuracy for Down syndrome and is quickly being applied to clinical practice, but expensive equipment and test consumables are required, and the analysis method is also complicated, making it difficult to apply in general laboratories, and there is a limitation in that the test is difficult to apply to all pregnant women due to the high costs. In addition, there is a method using single-nucleotide polymorphisms (SNPs) (PCR based NIPT), but there is no clear basis for the test accuracy, and a general use is limited because a special algorithm presented by each institution needs to be used. That is, for the above-mentioned chromosomal disease, research is actively being conducted on an analysis method capable of finding out the presence of the disease in advance through genetic analysis (Korean Patent Publication No. 10-2019-0003987), but is still incomplete.

With this background, the present inventors have completed the present disclosure, which may effectively test for Down syndrome through simple measurement of a methylation level of the genome, without the need to utilize existing expensive test equipment or special algorithms.

DISCLOSURE

Technical Problem

An aspect is to provide a composition for diagnosing Down syndrome, including an agent for measuring a methylation level of any one gene selected from the group consisting of MXRA8, MIB2, KIF26B, SP5, ZIC4, ENPEP, PITX2, SH3BP2, SEPP1, FLJ32255, SHROOM1, LINC00574, LOC154449, PRRT4, TMEM176B, MNX1, LOC101928483, EGFL7, NACC2, C9orf69, TLX1, FGF8, TACC2, CPXM2, NKX6-2, TLX1NB, IQSEC3, PCDH8, F7, SOX9, PNMAL2, THBD, MAPK8IP2, KLHDC7B, GPR143, IGHMBP2, MRGPRD, CHODL, NCAM2, CYYR1, GRIK1, OLIG2, CLIC6, SIM2, HLCS, MX2, MX1, TMPRSS2, SLC37A1, PDE9A, CBS, CRYAA, C21orf2, TRPM2, TSPEAR, LINC00162, SSR4P1, SLC19A1, LOC100129027, MCM3AP, YBEY, PRMT2, and ITSN1.

Another aspect is to provide a kit for diagnosing Down syndrome including the composition.

Still another aspect is to provide a method of diagnosing Down syndrome or a method of providing information for diagnosing Down syndrome, the method including: (a) measuring a methylation level of any one gene selected from the group consisting of MXRA8, MIB2, KIF26B, SP5, ZIC4, ENPEP, PITX2, SH3BP2, SEPP1, FLJ32255, SHROOM1, LINC00574, LOC154449, PRRT4, TMEM176B, MNX1, LOC101928483, EGFL7, NACC2, C9orf69, TLX1, FGF8, TACC2, CPXM2, NKX6-2, TLX1NB, IQSEC3, PCDH8, F7, SOX9, PNMAL2, THBD, MAPK8IP2, KLHDC7B, GPR143, IGHMBP2, MRGPRD, CHODL, NCAM2, CYYR1, GRIK1, OLIG2, CLIC6, SIM2, HLCS, MX2, MX1, TMPRSS2, SLC37A1, PDE9A, CBS, CRYAA, C21orf2, TRPM2, TSPEAR, LINC00162, SSR4P1, SLC19A1, LOC100129027, MCM3AP, YBEY, PRMT2, and ITSN1 from a biological sample isolated from a fetus; and (b) comparing the measured methylation level with a level of a sample of a normal control group.

Technical Solution

An aspect provides a composition for diagnosing Down syndrome, the composition including an agent for measuring a methylation level of any one gene selected from the group consisting of MXRA8, MIB2, KIF26B, SP5, ZIC4, ENPEP, PITX2, SH3BP2, SEPP1, FLJ32255, SHROOM1, LINC00574, LOC154449, PRRT4, TMEM176B, MNX1, LOC101928483, EGFL7, NACC2, C9orf69, TLX1, FGF8, TACC2, CPXM2, NKX6-2, TLX1NB, IQSEC3, PCDH8, F7, SOX9, PNMAL2, THBD, MAPK8IP2, KLHDC7B, GPR143, IGHMBP2, MRGPRD, CHODL, NCAM2, CYYR1, GRIK1, OLIG2, CLIC6, SIM2, HLCS, MX2, MX1, TMPRSS2, SLC37A1, PDE9A, CBS, CRYAA, C21orf2, TRPM2, TSPEAR, LINC00162, SSR4P1, SLC19A1, LOC100129027, MCM3AP, YBEY, PRMT2, and ITSN1.

The term "Down syndrome", used herein, refers to a kind of congenital genetic disease, in which one more full or partial copy of chromosome 21 is present than normal. Down syndrome causes delayed physical development and may be accompanied by facial deformities and Intellectual disabilities. Most of the chromosomes of a patient with a Down syndrome, which are inherited from parents, are normal, but there may be one more copy of chromosome 21 due to nondisjunction of reproductive cells during pregnancy. The incidence rate is 0.1% in 20-year-old mothers, but increases rapidly to 4% in 45-year-old mothers, and the incidence rate shows a tendency to increase with the mother's age. Down syndrome may be confirmed by a prenatal diagnosis of the fetus during pregnancy, and may be determined through direct genetic testing after childbirth.

The term "diagnosis", used herein, refers to confirming a presence or characteristics of a pathological state, and may include determining whether or not Down syndrome has occurred or is likely to occur.

The term "methylation", used herein, may mean that a methyl group is added to the 5th carbon of a cytosine residue of DNA, and may mean that a methyl group is attached to a base constituting DNA.

Preferably, an occurrence of methylation means an occurrence of methylation at the fifth carbon of a cytosine residue of a specific CpG site of a specific gene. When methylation occurs, binding of transcription factors is hindered, and therefore, expression of specific genes is inhibited, and conversely, when unmethylation or hypo-methylation occurs, expression of specific genes increases. In genomic DNA of mammalian cells, there is a fifth base called 5-methylcytosine (5-mC) with a methyl group attached to the fifth carbon of a cytosine ring, in addition to A, C, G, and T.

Methylation of 5-methylcytosine occurs mainly at C of CG dinucleotide (5'-mCG-3') called CpG, and methylation of CpG inhibits expression of alu or transposon and genomic repetitive sequences. In addition, since 5-mC of CpG is easy to be naturally deaminated to become thymine (T), CpG is a site where most epigenetic changes occur frequently in mammalian cells.

The term "measurement of a methylation level", used herein, may include measuring a level of methylation of Down syndrome-related gene biomarkers in a biological sample in order to diagnose Down syndrome. The measurement of a methylation level is to measure methylation levels of CpG sites, and any method known in the art for measuring a methylation level may be used without limitation, but methylation-specific PCR, for example, methylation-specific polymerase chain reaction (MSP), real-time methylation-specific polymerase chain reaction, PCR using binding proteins specific for methylated DNA, quantitative PCR, PCR using methylation-specific specific peptide nucleic acid (PNA), or melting curve analysis may be used. Alternatively, a methylation level may be measured by methods such as DNA chip, pyrosequencing, bisulfite sequencing, and automatic sequencing such as methyl-capture sequencing (MC-Seq), etc., but is not limited thereto.

The term "differentially methylated CpG site (DMC)", used herein, may refer to a CpG site that exhibits different DNA methylation states depending on the stage of development, type of tissue, and a presence or absence of a disease. A region in a genome where DMCs repeatedly exist may be referred to as "differentially methylated CpG region (DMR)". Most DNA methylation occurs at the CpG site, in which C represents cytosine, G represents guanine, and p may represent a phosphodiester bond between the cytosine and the guanine. In normal human somatic cells, the CpG island in the housekeeping gene promoter region is unmethylated, and genes that are not expressed during development, such as imprinted genes and inactive genes on the X chromosome, are methylated.

The agent for measuring a methylation level may be an agent for confirming the presence or absence of methylation of a gene, and may be for measuring an amount of methylated genes. The agent for measuring a methylation level may include, for example, a compound or methylation-specific restriction enzyme (MSRE) that modifies unmethylated cytosine bases, a primer specific for a methylated sequence of the gene, and a primer specific for an unmethylated sequence. The compound that modifies the unmethylated cytosine base may be bisulfite, but is not limited thereto, and may be preferably sodium bisulfite. This method of detecting methylation of a promoter by modifying an unmethylated cytosine residue by using bisulfite is well known in the art. The methylation-specific restriction enzyme refers to an enzyme that selectively cuts nucleic acids according to the methylation state of its restriction site. For restriction enzymes that specifically cleave when the restriction site is unmethylated or hemi-methylated, cleavage will not occur or will occur with significantly reduced efficiency when the restriction site is methylated. For restriction enzymes that specifically cleave when the restriction site is methylated, cleavage will not occur or will occur with significantly reduced efficiency when the restriction site is unmethylated.

The MXRA8, MIB2, KIF26B, SP5, ZIC4, ENPEP, PITX2, SH3BP2, SEPP1, FLJ32255, SHROOM1, LINC00574, LOC154449, PRRT4, TMEM176B, MNX1, LOC101928483, EGFL7, NACC2, C9orf69, TLX1, F8, NKX2, TACC2-2, TLX1NB, IQSEC3, PCDH8, F7, SOX9, PNMAL2, THBD, MAPK81P2, KLHDC7B, GPR143, IGHMBP2, and MRGPRD genes may be present on a chromosome other than chromosome 21.

The CHODL, NCAM2, CYYR1, GRIK1, OLIG2, CLIC6, SIM2, HLCS, MX2, MX1, TMPRSS2, SLC37A1, PDE9A, CBS, CRYAA, C21orf2, TRPM2, TSPEAR, LINC00162, SSR4P1, SLC19A1, LOC100129027, MCM3AP, YBEY, PRMT2, and ITSN1 genes may be present on chromosome 21.

The methylation level of any one gene selected from the group consisting of MXRA8, MIB2, KIF26B, SP5, ZIC4, ENPEP, PITX2, SH3BP2, SEPP1, FLJ32255, SHROOM1, LINC00574, LOC154449, PRRT4, TMEM176B, MNX1, LOC101928483, EGFL7, NACC2, C9orf69, TLX1, FGF8, TACC2, CPXM2, NKX6-2, TLX1NB, IQSEC3, PCDH8, F7, SOX9, PNMAL2, THBD, MAPK81P2, KLHDC7B, GPR143, CHODL, NCAM2, CYYR1, GRIK1, OLIG2, CLIC6, SIM2, HLCS, MX2, MX1, TMPRSS2, SLC37A1, PDE9A, CBS, CRYAA, C21orf2, TRPM2, TSPEAR, LINC00162, SSR4P1, SLC19A1, LOC100129027, MCM3AP, YBEY, and PRMT2 may be hyper-methylated in Down syndrome fetuses compared to normal fetuses or the mother.

The term "hyper-methylation" may refer to a state in which the methylation level of the experimental group is higher than that of the control group as a result of measuring the methylation level.

The methylation level of any one gene selected from the group consisting of IGHMBP2, MRGPRD, and ITSN1 may be hypo-methylated in a Down syndrome fetus compared to a normal fetus or the mother.

The term "hypo-methylation" may refer to a state in which the methylation level of the experimental group is lower than that of the control group as a result of measuring the methylation level.

The term "MXRA8" gene, used herein, refers to a gene encoding a matrix remodeling associated 8 protein. The gene or the protein encoded thereby has been known as a biomarker for diagnosing non-muscle invasive bladder cancer (Korean Patent Publication No. 10-2019-0089552).

The term "MIB2" gene, used herein, refers to a gene encoding a mindbomb E3 ubiquitin-protein ligase 2 (MIB2). The protein MIB2 encoded by the gene interacts with actin proteins (alpha 1) and is known to inhibit melanoma invasion.

The term "KIF26B" gene, used herein, refers to a gene encoding a kinesin family member 26B (KIF26B) protein. The protein encoded by the gene is an intracellular motor protein that transports cell organelles along microtubules, and is essential for kidney development, and increased levels of the protein have been observed in some breast and colorectal cancers.

The term "SP5" gene, used herein, means a gene encoding an Sp5 transcription factor. The gene is known to be involved in Wnt-mediated beta catenin signaling and regulation of target gene transcription.

The term "ZIC4" gene, used herein, refers to a gene encoding a zic family member 4 (ZIC4) protein, specifically, a zic family member protein of a C2H2-type zinc finger protein. The protein encoded by the gene is known to be associated with X-linked visceral heterotaxy and holoprosencephaly type 5.

The term "ENPEP" gene, used herein, refers to a gene encoding a glutamyl aminopeptidase. ENPEP is known to be associated with choriocarcinoma and gestational choriocarcinoma.

The term "PITX2" gene, used herein, refers to a gene encoding a protein also known as paired-like homeodomain transcription factor 2, or pituitary homeobox 2. Mutations in the gene are known to be associated with Axenfeld-Rieger syndrome, and iridogoniodysgenesis syndrome.

The term "SH3BP2" gene, used herein, refers to a gene encoding SH3 domain-binding protein 2 (SH3BP2) derived from a gene located on chromosome 4. The protein encoded by this gene is known to be associated with cherubism.

The term "SEPP1" gene, used herein, refers to a gene encoding selenoprotein P. The selenoprotein is an extracellular glycoprotein, which is uncommon in that it contains 9 Sec residues per polypeptide, and is known to act as an antioxidant in the extracellular space.

The term "FLJ32255" gene, used herein, is an uncharacterized LOC643977, which is an RNA gene associated with the lncRNA class.

The term "SHROOM1" gene, used herein, refers to a gene encoding a SHROOM family member 1 (SHROOM1) protein, which plays an important role in the development of the nervous system and other tissues and is involved in microtubule structure during cell elongation. Among the symptoms of Down syndrome, it is. Involved in congenital heart defects and arthritis.

The term "LINC00574" gene, used herein, means a long. Intergenic non-protein coding RNA 574, which is an RNA gene associated with the lncRNA class. The LINC00574 gene is known to be associated with breast cancer.

The term "LOC154449" gene, used herein, is an uncharacterized LOC154449, which is an RNA gene associated with the lncRNA class.

The term "PRRT4" gene, used herein, refers to a gene encoding proline rich transmembrane protein 4 (PRRT4), and is known to be associated with Zellweger Syndrome.

The term "TMEM176B" gene, used herein, is a gene encoding transmembrane protein 176B (TMEM176B), and is known to be involved in the maturation process of dendritic cells.

The term "MNX1" gene, used herein, refers to a gene encoding a protein also known as motor neuron and pancreas homeobox 1 (MNX1) protein or homeobox HB9 (HLXB9). Mutations in the gene are known to be associated with Currarino syndrome.

The term "LOC101928483" gene, used herein, refers to a non-coding RNA (ncRNA) and is also referred to as a NOTCH1 associated lncRNA in T cell acute lymphoblastic leukemia 1 (NALT1) gene.

The term "EGFL7" gene, used herein, refers to a gene encoding EGF-like domain-containing protein 7. Expression of the gene is endothelial cell-specific under physiological conditions, but the gene is known to be aberrantly expressed by tumor cells in human cancer.

The term "NACC2" gene, used herein, means a gene encoding a NACC family member 2 protein. The protein encoded by the gene is known to be associated with lateral myocardial infarction and interstitial myocarditis.

The term "C9orf69" gene, used herein, means a gene encoding transmembrane protein 250, and is also called TMEM250. It is known that the protein encoded by the gene is capable of playing an important role in cell proliferation by promoting progression to the S phase in the cell cycle.

The term "TLX1" gene, used herein, refers to a gene encoding T-cell leukemia homeobox protein 1 (TLX1), and is also called HOX11. The protein encoded by the gene is known to interact with serine/threonine-protein phosphatase PP1-gamma catalytic subunit (PPP1CC), serine/threonine-protein phosphatase 2A catalytic subunit beta isoform (PPP2CB), and serine/threonine-protein phosphatase 2A catalytic subunit alpha isoform (PPP2CA).

The term "FGF8" gene, used herein, refers to a gene encoding a fibroblast growth factor 8 (FGF8) protein. The protein encoded by the gene supports androgen- and anchorage-independent growth of mammary tumor cells, and overexpression of this gene is known to increase tumor growth and angiogenesis.

The term "TACC2" gene, used herein, refers to a gene encoding transforming acidic coiled-coil-containing protein 2 (TACC2). The gene encodes a protein that is accumulated at the centrosome throughout the cell cycle, and the gene is present in chromosomal regions associated with tumorigenesis. Expression of the gene is known to affect progression of breast tumors.

The term "CPXM2" gene, used herein, refers to a gene encoding a carboxypeptidase X, M14 family member 2 (CPXM2) protein.

The term "NKX6-2" gene, used herein, refers to a gene encoding an NK6 homeobox 2 (NKX6-2) protein. The protein encoded by the gene is known to be associated with spastic ataxia and autosomal recessive disease.

The term "TLX1NB" gene, used herein, refers to a TLX1 Neighbor (TLX1NB) RNA gene and belongs to the lncRNA class.

The term "IQSEC3" gene, used herein, refers to a human gene known as IQ motif and Sec7 domain 3, and is also called KIAA1110. It is known that the gene is highly expressed in the brain, particularly in the amygdala, and plays an important role in learning.

The term "PCDH8" gene, used herein, refers to a gene encoding a protocadherin-8 (PCDH8) protein. The gene encodes an endogenous membrane protein that is thought to function in cell adhesion in a central nervous system (CNS)-specific manner.

The term "F7" gene, used herein, refers to a gene encoding coagulation factor VII, a vitamin K-dependent factor essential for hemostasis. The gene is known to be associated with factor VII deficiency and myocardial infarction.

The term "SOX9" gene, used herein, means a gene encoding the transcription factor SOX-9 protein. Mutations in this gene are known to be associated with skeletal malformation syndrome and campomelic dysplasia.

The term "PNMAL2" gene, used herein, refers to a gene encoding a PNMA family member 8B protein, and an important paralog of the gene is PNMA8A. The protein encoded by the gene is paraneoplastic antigen-like protein 8B.

The term "THBD" gene, used herein, refers to a gene encoding a thrombomodulin protein. The protein encoded by the gene is a protein derived from endothelial cells of blood vessels and serves to prevent generation of blood clots, in cooperation with other factors.

The term "MAPK8IP2" gene, used herein, refers to a gene encoding C-Jun-amino-terminal kinase-interacting protein 2, and is also called islet-brain-2 (IB2). It is known that the protein encoded by the gene is highly expressed in the brain and is almost always lacking in Phelan-McDermid syndrome.

The term "KLHDC7B" gene, used herein, refers to a gene encoding a kelch domain containing 7B protein. This gene is known to be associated with *chlamydia* pneumonia.

The term "GPR143" gene, used herein, refers to a gene encoding a G-protein coupled receptor 143 (GPR143) protein. The gene is known to be regulated by microphthalmia-associated transcription factors.

The term "IGHMBP2", used herein, refers a gene that encodes immunoglobulin helicase μ-binding protein 2 (IGHMBP2), cardiac transcription factor 1 (CATF1), or a protein known as DNA-binding protein SMUBP-2. Mutations in the gene are known to cause distal spinal muscular atrophy type 1.

The term "MRGPRD" gene, used herein, refers to a gene encoding a Mas-related G-protein coupled receptor member D protein. The gene is known to be associated with femoral cancer and liver rhabdomyosarcoma.

The term "CHODL" gene, used herein, refers to a gene encoding a chondrolectin protein. The exact function of the protein encoded by the gene is unknown, but the gene has been shown to be a marker of fast motor neurons in mice.

The term "NCAM2" gene, used herein, refers to a gene encoding a neural cell adhesion molecule 2 protein. The gene is known to be associated with a prion disease.

The term "CYYR1" gene, used herein, refers to a gene encoding cysteine and tyrosine-rich protein 1 (CYYR1). The function of the protein encoded by the gene has not been specifically known.

The term "GRIK1" gene, used herein, refers to a gene encoding a glutamate receptor, Ionotropic, kainate 1 (GRIK1) protein. The gene encodes one of many subunits of a. Ionic glutamate receptor (GluR) that function as ligand-gated. Ion channels.

The term "OLIG2" gene, used herein, refers to a gene encoding an oligodendrocyte transcription factor protein. It is known that the expression of the gene is mainly restricted in the central nervous system, where the gene acts as both an anti-neurigenic and a neurigenic factor at different stages of development, and that the gene is mainly associated with brain tumors.

The term "CLIC6" gene, used herein, refers to a gene encoding chloride intracellular channel protein 6. The gene is known to interact with the dopamine receptor D3.

The term "SIM2" gene, used herein, refers to a gene encoding a single-minded homolog 2 protein. The protein encoded by the gene is known to play an important role in the development of the midline of the central nervous system as well as the construction of the face and head.

The term "HLCS" gene, used herein, refers to a gene encoding a holocarboxylase synthetase protein. The protein encoded by the gene plays an important role in effectively using vitamin B (biotin) found in foods such as egg yolk and milk, and is involved in many important cellular functions including production and breakdown of proteins, fats, and carbohydrates.

The term "MX2" gene, used herein, refers to a gene encoding interferon-induced GTP-binding protein Mx2. It is known that the protein encoded by the gene is up-regulated by. Interferon-alpha, but does not include the antiviral activity of the similar myxovirus resistance protein 1.

The term "MX1" gene, used herein, refers to a gene encoding. Interferon-induced GTP-binding protein Mx1. Interferon-induced Mx proteins are known to be associated with a specific antiviral state against influenza virus infection in mice.

The term "TMPRSS2" gene, used herein, refers to a gene encoding a transmembrane protease, serine 2 protein. Serine proteases are known to be involved in many physiological and pathological processes, and the gene is known to be up-regulated by androgen hormones in prostate cancer cells and down-regulated in androgen-independent prostate cancer tissues. However, the specific biological function of the gene is unknown.

The term "SLC37A1" gene, used herein, refers to a gene encoding a glucose-6-phosphate exchanger SLC37A1 protein. Unlike a SLC37A4 protein, the protein encoded by the gene does not appear to be involved in blood sugar homeostasis, but is known to regulate phosphate levels in cow's milk and affect the amount of milk produced.

The term "PDE9A" gene, used herein, refers to a gene encoding a high affinity cGMP-specific 3',5'-cyclic phosphodiesterase 9A protein. The protein encoded by the genes is known to play a role in signal transduction by regulating intracellular concentrations of cAMP and cGMP.

The term "CBS" gene, used herein, refers to a gene encoding a cystathionine beta-synthase. Defects in the gene are known to cause cystathionine beta-synthase deficiency (CBSD), resulting in homocystinuria.

The term "CRYAA" gene, used herein, refers to a gene encoding an alpha-crystallin A chain protein. Defects in the gene are known to cause autosomal dominant congenital cataract.

The term "C21orf2" gene, used herein, refers to a gene encoding cilia and flagella associated protein 410 (CFAP410). The gene is known to be associated with retinal dystrophy and spondylometaphyseal dysplasla.

The term "TRPM2" gene, used herein, refers to a gene encoding a transient receptor potential cation channel, subfamily M, member 2 protein. Although the physiological function of the gene is not precisely known, the gene has been reported to be involved in insulin secretion.

The term "TSPEAR" gene, used herein, refers to a gene encoding a thrombospondin type laminin G domain and EAR repeats protein. The gene is known to be related to hearing loss (deafness) and ectodermal dysplasia.

The term "LINC00162" gene, used herein, refers to a P38 inhibited cutaneous squamous cell carcinoma associated LincRNA (PICSAR) gene. The gene is known to be associated with narcolepsy and embryonal testis carcinoma.

The term "SSR4P1" gene, used herein, refers to signal sequence receptor subunit 4 pseudogene 1. The exact function of the gene is not known.

The term "SLC19A1" gene, used herein, refers to a gene encoding a folate transporter 1 protein. It is known that the protein encoded by the gene plays an important role in maintaining the concentration of folic acid in cells.

The term "LOC100129027" gene, used herein, refers to a PCBP3 antisense RNA 1 (PCBP3-AS1) gene. The specific biological function of the gene is unknown.

The term "MCM3AP" gene, used herein, refers to a gene encoding an 80 kDa MCM3-associated protein. The protein encoded by the gene is an MCM3 binding protein, which is known to have a phosphorylation-dependent DNA-primase activity.

The term "YBEY" gene, used herein, refers to a gene encoding a YbeY metalloendoribonuclease. The gene is known to be associated with mesenteric lymphadenitis.

The term "PRMT2" gene, used herein, refers to a gene encoding a protein arginine N-methyltransferase 2. The protein encoded by the gene is known to interact with estrogen receptor alpha.

The term "ITSN1" gene, used herein, refers to a gene encoding an intersectin-1 protein. The gene is known to be associated with vaccinia and schizophrenia 1.

Another aspect provides a kit for diagnosing Down syndrome including the composition for diagnosing Down syndrome.

The kit may be any one selected from the group consisting of an RT-PCR kit, a microarray chip kit, and a DNA kit.

The microarray refers broadly to both "DNA microarrays" and "DNA chip(s)" as recognized in the art, and may refer to all methods known in the art. Including a solid support, on which nucleic acid molecules are. Immobilized, or nucleic acids are synthesized thereon.

In another embodiment, the kit may be a kit. Including essential elements required to perform a microarray. The microarray kit. Includes a substrate to which a gene or cDNA corresponding to a fragment thereof is attached as a probe, and the substrate may include a quantitative control gene or cDNA corresponding to a fragment thereof and the microarray kit may be easily prepared by a manufacturing method commonly used in the art. In order to prepare a microarray, a micropipetting method using a piezoelectric method or a method using a pin-type spotter may be used to immobilize the searched markers as probe DNA molecules on a substrate of a DNA chip. The substrate of the microarray chip may be coated with an active group selected from the group consisting of amino-silane, poly-L-lysine, and aldehyde. In addition, the substrate may be one selected from the group consisting of slide glass, plastic, metal, silicon, nylon membrane, and nitrocellulose membrane.

Still another aspect provides a method of diagnosing Down syndrome, the method. Including: (a) measuring a methylation level of any one gene selected from the group consisting of MXRA8, MIB2, KIF26B, SP5, ZIC4, ENPEP, PITX2, SH3BP2, SEPP1, FLJ32255, SHROOM1, LINC00574, LOC154449, PRRT4, TMEM176B, MNX1, LOC101928483, EGFL7, NACC2, C9orf69, TLX1, FGF8, TACC2, CPXM2, NKX6-2, TLX1NB, IQSEC3, PCDH8, F7, SOX9, PNMAL2, THBD, MAPK81P2, KLHDC7B, GPR143, IGHMBP2, MRGPRD, CHODL, NCAM2, CYYR1, GRIK1, OLIG2, CLIC6, SIM2, HLCS, MX2, MX1, TMPRSS2, SLC37A1, PDE9A, CBS, CRYAA, C21orf2, TRPM2, TSPEAR, LINC00162, SSR4P1, SLC19A1, LOC100129027, MCM3AP, YBEY, PRMT2, and ITSN1 from a biological sample isolated from a fetus; and (b) comparing the measured methylation level with a level of a sample of a normal control group.

The term "biological sample", used herein, may. Include samples such as tissues, cells, whole blood, serum, plasma, saliva, sputum, cerebrospinal fluid, and urine isolated from a fetus, and may include cell-free DNA, which is DNA free in the blood and is not present in the cell nucleus.

The biological sample may be derived from the placenta. The term "placenta" refers to a structure that mediates material exchange between a fetus and the mother necessary for the growth and survival of the fetus, and is formed when a part of the fetal membrane surrounding the fetus adheres to the mother's endometrium. The placenta may. Include chorion. The term "chorion" corresponds to the middle layer among the decidua, chorion, and amnion, which are membranes that enclose amniotic fluid in the uterus. The chorion develops from the fertilized egg and forms part of the egg membrane, and the chorionic villi, which are myriad protrusions on the front side, grow densely and play a role in invading the fertilized egg into the inner wall of the uterus. For example, the biological sample may be derived from chorionic villus cells. Preferably, the biological sample may refer to cell-free DNA in maternal blood derived from chorionic villus cells.

The term "fetus", used herein, refers to a fetus for which whether or not Down syndrome occurred is to be identified or the risk of occurrence is to be predicted. The type of fetus is not limited as long as it is an animal that may have Down syndrome, but may specifically be a mammal, for example, a human (*Homo sapiens*).

The method may further include determining as Down syndrome when a methylation level of any one gene selected from the group consisting of MXRA8, MIB2, KIF26B, SP5, ZIC4, ENPEP, PITX2, SH3BP2, SEPP1, FLJ32255, SHROOM1, LINC00574, LOC154449, PRRT4, TMEM176B, MNX1, LOC101928483, EGFL7, NACC2, C9orf69, TLX1, FGF8, TACC2, CPXM2, NKX6-2, TLX1NB, IQSEC3, PCDH8, F7, SOX9, PNMAL2, THBD, MAPK81P2, KLHDC7B, GPR143, CHODL, NCAM2, CYYR1, GRIK1, OLIG2, CLIC6, SIM2, HLCS, MX2, MX1, TMPRSS2, SLC37A1, PDE9A, CBS, CRYAA, C21orf2, TRPM2, TSPEAR, LINC00162, SSR4P1, SLC19A1, LOC100129027, MCM3AP, YBEY, and PRMT2, which is measured from a biological sample isolated from a fetus, is increased compared to a normal control group in the process (b).

The method may further. Include determining as Down syndrome when a methylation level of IGHMBP2, MGRPRD, or ISTN1 gene measured from a biological sample isolated from a fetus is decreased compared to that of the normal control group, in the process (b).

The method of measuring a methylation level may be one selected from the group consisting of PCR, methylation specific PCR, real time methylation specific PCR, PCR using binding proteins specific for methylated DNA, quantitative PCR, PCR using methylation-specific specific peptide nucleic acid (PNA), melting curve analysis, DNA chip, pyrosequencing, bisulfite sequencing, and methyl-capture sequencing (MC-Seq).

The method may include comparing the measured methylation level with that of a sample of the normal control group. When the methylation level in the sample is higher or lower than that of the sample of the normal control group, it may be determined that the fetus has or is likely to have Down syndrome. The changed methylation level may include a similar level, or a level increased 1%, 2%, 3%, 4%, 5%, 10%, 20%, 30%, 40%, 50%, 60%, 70%, 80%, 90%, 100%, 200%, 300%, 400%, 500%, 600%, 700%, 800%, 900%, and 1,000% or more, compared to the normal control group or negative control group.

In an embodiment, it was confirmed that the biomarker genes for diagnosis of Down syndrome may be detected in an on-off form through a difference in the methylation levels. Specifically, as a result of measuring DNA methylation levels of CHODL, NCAM2, CYYR1, GRIK1, OLIG2, CLIC6, SIM2, HLCS, MX2, MX1, TMPRSS2, SLC37A1, PDE9A, CBS, CRYAA, C21orf2, TRPM2, TSPEAR, LINC00162, SSR4P1, SLC19A1, LOC100129027, MCM3AP, YBEY, PRMT2, and ITSN1, which are Down syndrome-specific biomarkers present on chromosome 21, there was a tissue-specific difference in methylation levels of 10% or more between normal maternal blood and normal fetal placentas, and a disease-specific difference in methylation levels of 10% or more between normal fetal placentas and Down syndrome fetal placentas.

In addition, as a result of measuring DNA methylation levels of MXRA8, MIB2, KIF26B, SP5, ZIC4, ENPEP, PITX2, SH3BP2, SEPP1, FLJ32255, SHROOM1, LINC00574, LOC154449, PRRT4, TMEM176B, MNX1, LOC101928483, EGFL7, NACC2, C9orf69, TLX1, FGF8, TACC2, CPXM2, NKX6-2, TLX1NB, IQSEC3, PCDH8, F7, SOX9, PNMAL2, THBD, MAPK8IP2, KLHDC7B, GPR143, IGHMBP2, and MRGPRD, which are Down syndrome-specific biomarkers present on a chromosome other than chromosome 21, there was a tissue-specific difference in methylation levels of 10% or more between the normal maternal blood and the normal fetal placentas, and a disease-specific difference in methylation levels of 30% or more between the normal fetal placentas and Down syndrome fetal placentas.

Still another aspect provides a method of providing. Information for diagnosing Down syndrome including: (a) measuring a methylation level of any one gene selected from the group consisting of MXRA8, MIB2, KIF26B, SP5, ZIC4, ENPEP, PITX2, SH3BP2, SEPP1, FLJ32255, SHROOM1, LINC00574, LOC154449, PRRT4, TMEM176B, MNX1, LOC101928483, EGFL7, NACC2, C9orf69, TLX1, FGF8, TACC2, CPXM2, NKX6-2, TLX1NB, IQSEC3, PCDH8, F7, SOX9, PNMAL2, THBD, MAPK8IP2, KLHDC7B, GPR143, IGHMBP2, MRGPRD, CHODL, NCAM2, CYYR1, GRIK1, OLIG2, CLIC6, SIM2, HLCS, MX2, MX1, TMPRSS2, SLC37A1, PDE9A, CBS, CRYAA, C21orf2, TRPM2, TSPEAR, LINC00162, SSR4P1, SLC19A1, LOC100129027, MCM3AP, YBEY, PRMT2, and ITSN1 from a biological sample isolated from a fetus; and (b) comparing the measured methylation level with the level of a sample of the normal control group.

Other details of the biological sample, fetus, process (a), and process (b) are as described above.

Still another aspect provides a use of the composition including an agent for measuring a methylation level of any one gene selected from the group consisting of MXRA8, MIB2, KIF26B, SP5, ZIC4, ENPEP, PITX2, SH3BP2, SEPP1, FLJ32255, SHROOM1, LINC00574, LOC154449, PRRT4, TMEM176B, MNX1, LOC101928483, EGFL7, NACC2, C9orf69, TLX1, FGF8, TACC2, CPXM2, NKX6-2, TLX1NB, IQSEC3, PCDH8, F7, SOX9, PNMAL2, THBD, MAPK8IP2, KLHDC7B, GPR143, IGHMBP2, MRGPRD, CHODL, NCAM2, CYYR1, GRIK1, OLIG2, CLIC6, SIM2, HLCS, MX2, MX1, TMPRSS2, SLC37A1, PDE9A, CBS, CRYAA, C21orf2, TRPM2, TSPEAR, LINC00162, SSR4P1, SLC19A1, LOC100129027, MCM3AP, YBEY, PRMT2, and ITSN1.

Details of the gene and the agent for measuring a level of methylation are as described above.

Advantageous Effects

According to a composition for diagnosing Down syndrome, a kit for diagnosing Down syndrome including the composition, and a method of diagnosing Down syndrome, Down syndrome may be diagnosed more simply and accurately, wherein the composition includes an agent for measuring a methylation level of any one gene selected from the group consisting of MXRA8, MIB2, KIF26B, SP5, ZIC4, ENPEP, PITX2, SH3BP2, SEPP1, FLJ32255, SHROOM1, LINC00574, LOC154449, PRRT4, TMEM176B, MNX1, LOC101928483, EGFL7, NACC2, C9orf69, TLX1, FGF8, TACC2, CPXM2, NKX6-2, TLX1NB, IQSEC3, PCDH8, F7, SOX9, PNMAL2, THBD, MAPK8IP2, KLHDC7B, GPR143, IGHMBP2, MRGPRD, CHODL, NCAM2, CYYR1, GRIK1, OLIG2, CLIC6, SIM2, HLCS, MX2, MX1, TMPRSS2, SLC37A1, PDE9A, CBS, CRYAA, C21orf2, TRPM2, TSPEAR, LINC00162, SSR4P1, SLC19A1, LOC100129027, MCM3AP, YBEY, PRMT2, and ITSN1.

MODE FOR INVENTION

Figure 1:
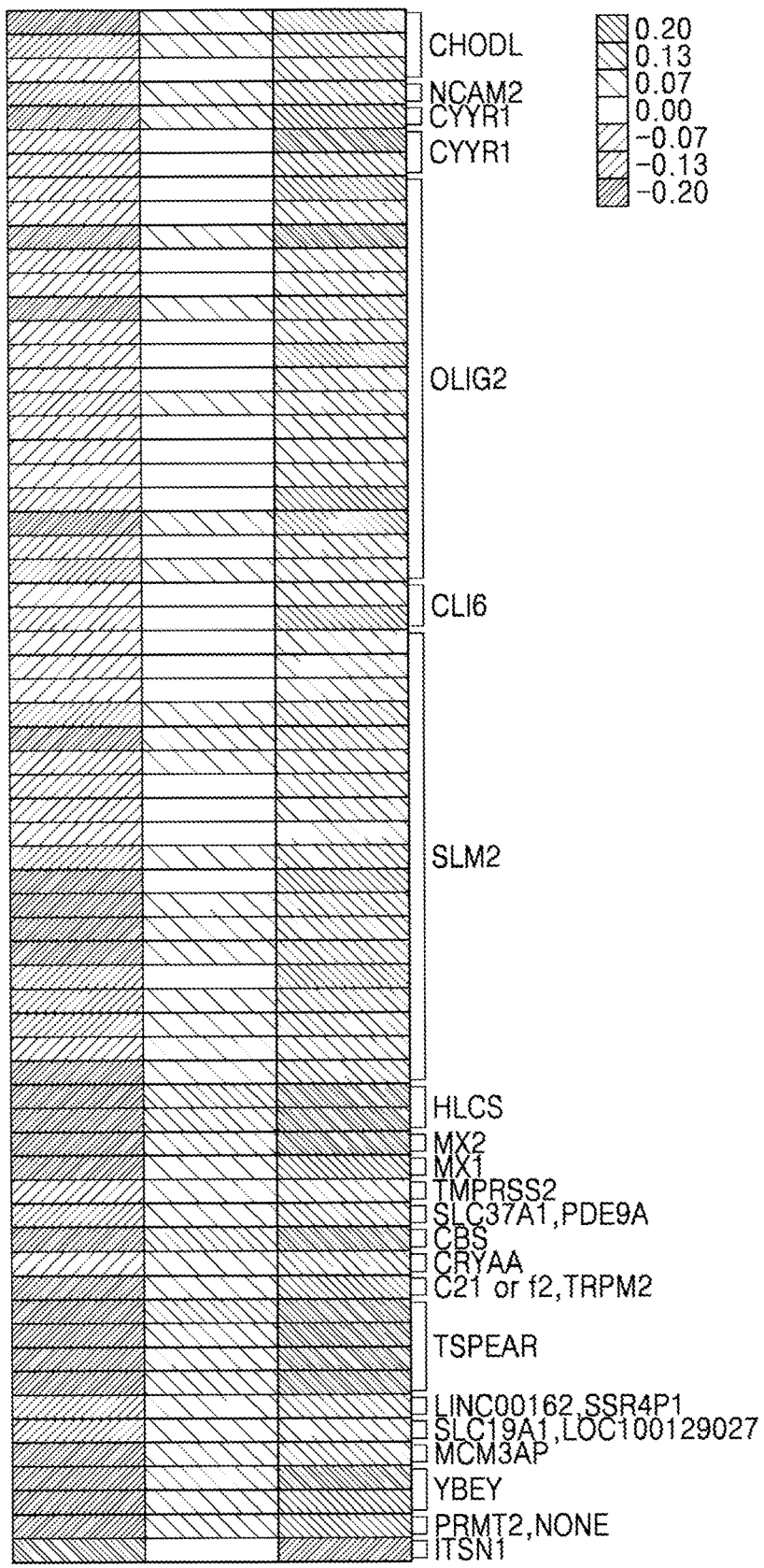
FIG. 1 shows results of comparing average methylation levels among 65 biomarker groups through analysis of methylation levels of chromosome 21 for normal maternal blood (NB), normal fetal placental tissue (NT), and Down syndrome fetal placental tissue (T21T).

Hereinafter, the present disclosure will be described in more detail through examples. However, these examples are intended to illustrate the present disclosure, and the scope of the present disclosure is not limited to these examples.

Example 1: DNA Isolation from Maternal Blood and Placental Tissue

The experiment was conducted under approval of the Institutional Review Board of Cheil hospital (#CGH-IRB-2016-5). This experiment was conducted on pregnant women with singleton pregnancy who received medical cares in the department of obstetrics and gynecology at Cheil Hospital from June, 2015 to May, 2017. Written. Informed consent was obtained from all patients with IRB approval.

The placental tissue was chorionic villus cells used for chorionic villus tests which are harvested in early pregnancy (12 to 13 weeks of gestation) and stored in liquid nitrogen until analysis. The gestational age of each fetus was determined by ultrasonography. A chromosome analysis using the Giemsa-trypsin-Giemsa (GTG) banding method was performed to determine the karyotype of fetal chorionic villus cells. All the placental tissues of the Down syndrome (DS) group had a full extra copy of HSA21 (47, XX, +21, or 47, XY, +21), and all the placental tissues of the control group (normal, N) exhibited a normal karyotype (46, XX, or 46, XY). The sex ratio of fetuses was matched between the experimental group (Down syndrome fetus group) and the control group (normal fetus group). Genomic DNA of each sample was extracted from chorionic villus cells by using the QIAamp DNA mini kit (Qiagen, catalog number 51304) according to the manufacturers instructions. Maternal blood was collected prior to chorionic villus testing and genomic DNA was immediately extracted by using the QIAamp DNA mini kit (Qiagen, catalog number 51304) according to the manufacturers instructions and stored in a cryogenic freezer until analyzed.

As shown in Table 1 below, there was no significant difference between the experimental group and the control group in relation to the maternal age, gestational age, translucency, and fetal sex ratio in the collection of chorionic villus cells (P>0.05).

TABLE 1

| Number | Karyotype | Gestational age (weeks) | Sex of the fetus | Maternal age | Nuchal translucency (mm) |
|---|---|---|---|---|---|
| N1 | 46, XY | 12 + 1 | Male | 35 | 4.4 |
| N2 | 46, XY | 12 + 1 | Male | 38 | 1.9 |
| N3 | 46, XX | 12 + 6 | Female | 39 | 2.5 |
| N4 | 46, XY | 12 + 1 | Male | 37 | 2.8 |
| N5 | 46, XX | 12 + 1 | Female | 37 | 2.8 |
| D1 | 47, XX, +21 | 12 + 4 | Female | 35 | 3.9 |
| D2 | 47, XY, +21 | 12 + 1 | Male | 39 | 2.9 |

TABLE 1-continued

| Number | Karyotype | Gestational age (weeks) | Sex of the fetus | Maternal age | Nuchal translucency (mm) |
|---|---|---|---|---|---|
| D3 | 47, XY, +21 | 12 + 3 | Male | 39 | 4.6 |
| D4 | 47, XX, +21 | 12 + 1 | Female | 41 | 4.9 |
| D5 | 47, XY, +21 | 13 + 1 | Male | 33 | 9.1 |

*117

Example 2: High Efficiency Methylome Profiling by Using MC-seq

Based on the DNA samples of the normal maternal blood, the normal fetal placental tissues, and the Down syndrome placental tissues collected in Example 1, DNA methylation was quantified at various CpG sites by using MC-seq, and methylome profiling was performed.

A standard DNA methylation region capture library was generated by using the SureSelect Methyl-Seq Target Enrichment protocol (Agilent) for paired-end sequencing libraries (ver. B.3, June 2015; Illumina) with 3 μg of genomic DNA. A SureSelect Human Methyl-Seq probe set (Agilent, catalog number 5190-4662) was used. Quantification of DNA and quality assessment of DNA were performed by measuring with a PicoGreen assay kit (Thermo Fisher Scientific, catalog number P7589) and a Nanodrop spectrophotometer (NanoDrop Technologies, catalog number ND-2000), respectively. 3 μg of the genome was fragmented to a target size of 150 bp to 200 bp of DNA by using an ultrasonicator (AFA; Covaris, catalog number 500219). Briefly, 8 microtube strips were loaded onto the tube holder of the sonicator and DNA was sheared by using the following setting: mode, frequency sweeping; duty cycle, 10%; intensity, 5; cycles per burst, 200; duration, 60 sec×6 cycles; temperature, 4° C. to 7° C. The fragmented DNAs were repaired, 'A' was ligated to the 3' end, and SureSelect Methyl-Seq Methylated Adapter was ligated to the fragment. After the ligation was evaluated, the adapter-ligated products were amplified by PCR.

Subsequently, the final purified product, such as methylated adapter-ligated DNA was then quantified according to the qPCR quantification protocol guide and verified by using a TapeStation DNA screen tape D1000 (Agilent, catalog number 5067-5582). For DNA methylation region capture, 350 ng of DNA library was mixed with hybridization buffer, blocking mix, RNase block, and 5 μl of SureSelect All DNA methylation region capture library according to the standard SureSelect Methyl-Seq Target Enrichment protocol (Agilent). Hybridization with capture baits was performed at 65° C. by using a PCR machine with a thermal cycler read option heated at 105° C. for 24 hours. The target captured DNA was treated with bisulfite by using a EZ DNA Methylation-Gold Kit (Zymo Research, catalog number D5005), and 8 PCR cycles to enrich the adapter-added fragments and 6 PCR cycles to add multiplexing barcodes were performed. The captured DNA was amplified. The final purified product was quantified by using the qPCR quantification protocol guide mentioned above and verified by using the TapeStation DNA screen tape D1000 (Agilent, catalog number 5067-582). Sequencing was performed by using the HISeq™ 2500 platform (Illumina, catalog number SY-401-2501).

Example 3: Data Processing and Methylation Profiling

Data processing and methylation profiling analysis were performed for the final product methylated in Example 2.

The quality of the paired end raw reads generated from the sequencing was identified by using a FastQC software (version 0.11.5). Before starting the analysis, Trimmomatic (version 0.32) was used to remove adapter sequences and bases with a base quality of 3 or less from the final data. In addition, the sliding window trim method was used to remove bases that did not satisfy window size=4 and average quality=15. Data with a minimum length of 36 bp were removed to generate organized data. The washed reads were aligned to the $Homo$ $sapiens$ genome (UCSC hg19) by using a bisulfite sequencing MAPping program (BSMAP; version 2.90 parameters set-n 1-r 0) based on an unidirectional short oligonucleotide alignment program (SOAP), and the washed reads could be uniquely mapped in the data. The mapped data in a SAM file format were aligned and indexed by using SAMtools (version 1.2). PCR duplicates were removed with sambamba (version 0.5.9). Methylation levels were measured with the metratio.py feature in the BSMAP program. A methylation ratio higher than the 10 CT number of all single cytosines located in the Agilent SureSelect target region may indicate that general methylation is completed. For regions covered by both ends of a read pair, only one read was used to call methylation. The profiles within the range the results are applied were summarized as follows: # of C/actual CT number for each of the three sequence contexts (CG, CHG, and CHH).

After reading the methylation level, the methylation level at each base of CpG was normalized with intermediate scaling normalization to distinguish between DMCs and DMRs. For five comparison pairs, an independent T-test was used to assess significance of differences of the methylation between the two groups. For the P value, false discovery results were controlled in multiple tests by using the Benjamini and Hochberg false discovery rate (FDR) method, and correcting. An analysis of main components showed segregation of the samples based on the disease status (normal or DS) as in previous studies, but not on fetal sex. DMC was determined by filtering out each region associated with |delta_mean|≥0.1, independent T-test p-value<0.05, and FDR<0.05. DMR was defined as a contiguous region of any length containing ≥3 DMCs. A hierarchical clustering analysis was also performed by using complete linkage and Euclidean distance as measures of similarity for indicating methylation levels of samples for significant CpGs that satisfy one or more comparison pairs. Heatmaps were automatically plotted by centroid linkage by using the centroid absolute correlation of similarity metric. All data analysis and visualization of differentially methylated results were performed by using R 3.3.1 (www.r-project.org) and Statistical Package for Social Sciences 12.0 (SPSS Inc.).

Example 4: Discovery of Specific Epigenetic Markers in Down Syndrome Fetal Placentas Genomic methylation patterns were comparatively analyzed at a CpG site level by using the method disclosed in Example 2, for 5 samples each of blood of mothers with normal fetuses, normal fetal placentas, and Down syndrome fetal placentas obtained in Example 1. In this regard, the methylation level (%) of each CpG site was expressed in a scale of 0 to 100, with 0 being unmethylated and 100 being completely methylated. Depending on the difference in methylation levels that was comparatively analyzed, hyper-methylated or hypo-methylated biomarkers were discovered.

4-1. Comparison of Methylation Levels on Chromosome 21

The CHODL, NCAM2, CYYR1, GRIK1, OLIG2, CLIC6, SIM2, HLCS, MX2, MX1, TMPRSS2, SLC37A1, PDE9A, CBS, CRYAA, TRPM2, C21orf2, TSPEAR, LINC00162, SSR4P1, SLC19A1, LOC100129027, MCM3AP, YBEY, PRMT2, and ITSN1 gene regions were selected as regions with three or more consecutive epigenetic characteristics of the same type from chromosome 21, the target chromosome of Down syndrome. Detailed information of the selected 65 gene regions is shown in Table 2 below.

TABLE 2

| Gene symbol | Functional part | bp | Number of CGs | Seq. |
|---|---|---|---|---|
| CHODL | UTR5 | 72 | 6 | chr21-19617176-19617247 |
|  |  | 71 | 13 | chr21-19617336-19617406 |
|  | intronic | 80 | 9 | chr21-19617673-19617752 |
| NCAM2 | upstream | 36 | 5 | chr21-22370043-22370078 |
| CYYR1 | intronic | 176 | 4 | chr21-27944498-27944673 |
| GRIK1 | intronic | 52 | 3 | chr21-31311263-31311314 |
|  |  | 125 | 11 | chr21-31311387-31311511 |
| OLIG2 | intergenic | 235 | 14 | chr21-34391993-34392227 |
|  |  | 17 | 4 | chr21-34392448-34392476 |
|  |  | 173 | 7 | chr21-34392696-34392868 |
|  |  | 42 | 4 | chr21-34395135-34395176 |
|  |  | 75 | 5 | chr21-34395490-34395566 |
|  |  | 90 | 6 | chr21-34395876-34395965 |
|  |  | 50 | 3 | chr21-34396297-34396346 |
|  |  | 269 | 16 | chr21-34396460-34396728 |
|  |  | 117 | 9 | chr21-34397003-34397119 |
|  | exonic | 71 | 12 | chr21-34399292-34399362 |
|  |  | 103 | 12 | chr21-34399427-34399529 |
|  |  | 34 | 4 | chr21-34399681-34399714 |
|  |  | 56 | 8 | chr21-34399848-34399903 |
|  | UTR3 | 68 | 10 | chr21-34400145-34400212 |
|  |  | 275 | 9 | chr21-34400714-34400988 |
|  |  | 14 | 3 | chr21-34401366-34401379 |
|  | downstream | 236 | 11 | chr21-34401534-34401769 |
| CLIC6 | exonic | 32 | 6 | chr21-36042254-36042285 |
|  |  | 203 | 25 | chr21-36042533-36042735 |
| SIM2 | intergenic | 81 | 4 | chr21-38067964-38068044 |
|  |  | 389 | 29 | chr21-38068418-38068806 |
|  |  | 173 | 15 | chr21-38069018-38069190 |
|  |  | 1206 | 87 | chr21-38069475-38070680 |
|  | intronic | 13 | 3 | chr21-38072494-38072506 |
|  |  | 44 | 5 | chr21-38073032-38073075 |
|  |  | 66 | 8 | chr21-38073463-38073528 |
|  |  | 57 | 3 | chr21-38073992-38074050 |
|  |  | 31 | 3 | chr21-38074152-38074184 |
|  |  | 181 | 6 | chr21-38074992-38075172 |
|  |  | 343 | 30 | chr21-38076769-38077111 |
|  |  | 193 | 12 | chr21-38077206-38077398 |
|  |  | 197 | 8 | chr21-38078262-38078458 |
|  |  | 232 | 7 | chr21-38079128-38079359 |
|  |  | 39 | 4 | chr21-38079924-38079962 |
|  |  | 191 | 18 | chr21-38079988-38080178 |
|  |  | 55 | 7 | chr21-38081200-38081254 |
|  |  | 62 | 7 | chr21-38081394-38081455 |
|  |  | 17 | 4 | chr21-38083112-38083128 |
| HLCS | intronic | 76 | 8 | chr21-38352985-38353060 |
|  | UTR5 | 65 | 4 | chr21-38353193-38353257 |
| MX2 | intronic | 177 | 14 | chr21-42741677-42741853 |
| MX1 | intronic | 154 | 13 | chr21-42798695-42798848 |
| TMPRSS2 | intronic | 90 | 3 | chr21-42878480-42878569 |
| SLC37A1, PDE9A | intergenic | 46 | 3 | chr21-44011221-44011266 |
| CBS | UTR3 | 97 | 4 | chr21-44473401-44473497 |
| CRYAA | upstream | 137 | 13 | chr21-44588388-44588457 |
| C21orf2, TRPM2 | intergenic | 88 | 12 | chr21-45769923-45770010 |
| TSPEAR | intronic | 167 | 8 | chr21-46126022-46126188 |
|  |  | 210 | 17 | chr21-46126891-46127100 |
|  |  | 179 | 10 | chr21-46128800-46128978 |
|  |  | 531 | 39 | chr21-46129159-46129689 |
| LINC00162, SSR4P1 | intergenic | 27 | 3 | chr21-46439211-46439237 |
| SLC19A1, LOC100129027 | intergenic | 23 | 3 | chr21-47062136-47062158 |
| MCM3AP | exonic | 33 | 4 | chr21-47704178-47704210 |
| YBEY | downstream | 25 | 4 | chr21-47717843-47717867 |
|  |  | 93 | 13 | chr21-47717931-47718023 |

TABLE 2-continued

| Gene symbol | Functional part | bp | Number of CGs | Seq. |
|---|---|---|---|---|
| PRMT2, NONE | intergenic | 76 | 11 | chr21-48087183-48087258 |
| ITSN1 | intronic | 63 | 4 | chr21-35246628-35246690 |

The degrees of methylation (the value obtained by dividing the methylation level (%) by 100) of the selected gene regions in normal maternal blood, normal fetal placentas, and Down syndrome fetal placentas are shown in Table 3 below and FIG. 1.

TABLE 3

| Epigenetic Characteristics | Gene symbol | Normal maternal blood | Normal fetal placenta | Down syndrome fetal placenta |
|---|---|---|---|---|
| Hyper-methylation | CHODL | 0.05 | 0.31 | 0.44 |
| | | 0.04 | 0.26 | 0.37 |
| | | 0.01 | 0.15 | 0.30 |
| | NCAM2 | 0.02 | 0.23 | 0.34 |
| | CYYR1 | 0.04 | 0.29 | 0.39 |
| | GRIK1 | 0.14 | 0.29 | 0.46 |
| | | 0.09 | 0.27 | 0.40 |
| | OLIG2 | 0.02 | 0.18 | 0.34 |
| | | 0.03 | 0.15 | 0.29 |
| | | 0.03 | 0.28 | 0.43 |
| | | 0.03 | 0.19 | 0.31 |
| | | 0.02 | 0.12 | 0.25 |
| | | 0.02 | 0.23 | 0.34 |
| | | 0.04 | 0.18 | 0.31 |
| | | 0.11 | 0.24 | 0.40 |
| | | 0.10 | 0.23 | 0.38 |
| | | 0.06 | 0.25 | 0.36 |
| | | 0.06 | 0.19 | 0.32 |
| | | 0.04 | 0.20 | 0.30 |
| | | 0.03 | 0.13 | 0.27 |
| | | 0.06 | 0.21 | 0.37 |
| | | 0.06 | 0.28 | 0.40 |
| | | 0.03 | 0.20 | 0.31 |
| | | 0.04 | 0.24 | 0.34 |
| Hyper-methylation | CLIC6 | 0.01 | 0.13 | 0.24 |
| | | 0.02 | 0.16 | 0.33 |
| | SIM2 | 0.12 | 0.22 | 0.34 |
| | | 0.11 | 0.25 | 0.35 |
| | | 0.08 | 0.19 | 0.29 |
| | | 0.05 | 0.26 | 0.38 |
| | | 0.04 | 0.30 | 0.40 |
| | | 0.03 | 0.22 | 0.32 |
| | | 0.04 | 0.22 | 0.33 |
| | | 0.04 | 0.20 | 0.32 |
| | | 0.04 | 0.19 | 0.30 |
| | | 0.12 | 0.32 | 0.45 |
| | | 0.04 | 0.23 | 0.39 |
| | | 0.08 | 0.31 | 0.42 |
| | | 0.11 | 0.34 | 0.44 |
| | | 0.09 | 0.33 | 0.44 |
| | | 0.09 | 0.31 | 0.45 |
| | | 0.08 | 0.30 | 0.43 |
| | | 0.04 | 0.25 | 0.37 |
| | | 0.04 | 0.24 | 0.35 |
| | | 0.06 | 0.29 | 0.39 |
| | HLCS | 0.04 | 0.57 | 0.71 |
| | | 0.03 | 0.50 | 0.66 |
| | MX2 | 0.26 | 0.62 | 0.74 |
| | MX1 | 0.05 | 0.30 | 0.45 |
| | TMPRSS2 | 0.33 | 0.54 | 0.64 |
| | SLC37A1, PDE9A | 0.08 | 0.31 | 0.42 |

TABLE 3-continued

| Epigenetic Characteristics | Gene symbol | Normal maternal blood | Normal fetal placenta | Down syndrome fetal placenta |
|---|---|---|---|---|
| Hyper-methylation | CBS | 0.21 | 0.67 | 0.77 |
| | CRYAA | 0.43 | 0.61 | 0.71 |
| | C21orf2, TRPM2 | 0.15 | 0.41 | 0.54 |
| | TSPEAR | 0.12 | 0.60 | 0.73 |
| | | 0.16 | 0.57 | 0.72 |
| | | 0.09 | 0.46 | 0.62 |
| | | 0.05 | 0.46 | 0.62 |
| | LINC00162, SSR4P1 | 0.23 | 0.48 | 0.59 |
| | SLC19A1, LOC100129027 | 0.24 | 0.46 | 0.57 |
| | MCM3AP | 0.16 | 0.44 | 0.55 |
| | YBEY | 0.06 | 0.49 | 0.67 |
| | | 0.11 | 0.48 | 0.64 |
| | PRMT2, NONE | 0.01 | 0.34 | 0.44 |
| Hypo-methylation | ITSN1 | 0.92 | 0.66 | 0.36 |

A difference in methylation levels between normal fetal placentas and maternal blood cells, and a difference in methylation levels between Down syndrome fetal placentas and normal fetal placentas were compared.

As a result, as shown in Table 3 and FIG. 1, the CHODL, NCAM2, CYYR1, GRIK1, OLIG2, CLIC6, SIM2, HLCS, MX2, MX1, TMPRSS2, SLC37A1, PDE9A, CBS, CRYAA, TRPM2, C21orf2, TSPEAR, SSR4P1, LINC00162, MCM3AP, YBEY, and PRMT2 (NONE) gene regions were confirmed to be hyper-methylated in the fetal placentas, especially in the Down syndrome fetal placentas. Specifically, the difference in methylation levels of the genes between the normal fetal placentas and maternal blood cells was 10 to 55, and the genes were hyper-methylated in the fetal placentas compared to the maternal blood, and thus, the genes were confirmed to be tissue (placenta)-specific biomarkers. In addition, the difference in methylation levels of the genes between the Down syndrome fetal placentas and normal fetal placentas was 10 to 20, confirming that the genes are disease (Down syndrome)-specific biomarkers hyper-methylated in a Down syndrome fetus compared to a normal fetus. Differences in the methylation levels among the Down syndrome fetal placentas and the other two groups (normal fetal placentas and maternal blood) were all statistically significant ($P<0.05$).

In addition, it was confirmed that the ITSN1 gene region was hypo-methylated in the Down syndrome fetal placentas. Specifically, it was confirmed that the methylation level of the ITSN1 gene region in maternal blood cells was 90 or more, and the methylation level in the normal fetal placentas was 65 or more, and hyper-methylated, whereas the methylation level in the Down syndrome fetal placentas was 40 or less, and hypo-methylated. The difference in methylation levels between the groups was 25 or more. Even in this case, differences in the methylation levels among the Down syndrome fetal placentas and the other two groups (normal fetal placentas and maternal blood) were all statistically significant (P<0.05).

4-2. Comparison of Methylation Levels in Other Chromosomes, Except for Chromosome 21

The MXRA8, MIB2, KIF26B, SP5, ZIC4, ENPEP, PITX2, SH3BP2, SEPP1, FLJ32255, SHROOM1, LINC00574, LOC154449, PRRT4, TMEM176B, MNX1, LOC101928483, EGFL7, NACC2, C9orf69, TLX1, FGF8, TACC2, CPXM2, NKX6-2, TLX1NB, IQSEC3, PCDH8, F7, SOX9, PNMAL2, THBD, MAPK8IP2, KLHDC7B, GPR143, IGHMBP2, and MRGPRD gene regions were selected as regions with two or more consecutive epigenetic characteristics of the same type. Detailed information of the selected 33 gene regions is shown in Table 4 below.

TABLE 4

| Chromosome | Gene symbol | Region Functional part | bp | Seq. |
|---|---|---|---|---|
| 1 | MXRA8 | exonic | 4 | chr1-1290330-1290333 |
| 1 | MIB2 | exonic | 14 | chr1-1564776-1564789 |
| 1 | KIF26B | exonic | 383 | chr1-245851435-245851817 |
| 2 | SP5 | exonic | 21 | chr2-171573145-171573165 |
| 3 | ZIC4 | exonic | 57 | chr3-147113849-147113905 |
| 4 | ENPEP, PITX2 | intergenic | 21 | chr4-111532737-111532757 |
| 4 | SH3BP2 | | 39 | chr4-2800726-2800764 |
| 5 | SEPP1, FLJ32255 | intergenic | 78 | chr5-42950062-42950139 |
| 5 | SHROOM1 | exonic | 83 | chr5-132158665-132158747 |
| | | intronic | 91 | chr5-132158828-132158918 |
| | | exonic | 16 | chr5-132158969-132158984 |
| 6 | LINC00574, LOC154449 | intergenic | 269 | chr6-170338448-170338716 |
| 7 | PRRT4 | exonic | 12 | chr7-127991715-127991726 |
| 7 | TMEM176B | intronic | 6 | chr7-150497697-150497702 |
| 7 | MNX1 | downstream | 9 | chr7-156796810-156796818 |
| 9 | LOC101928483, EGFL7 | intergenic | 29634 | chr9-139482774-139512407 |
| 9 | NACC2, C9orf69 | intergenic | 20 | chr9-139001913-139001932 |
| 10 | TLX1 | intronic | 1074 | chr10-102893888-102894961 |
| 10 | FGF8 | intronic | 4 | chr10-103535480-103535483 |
| 10 | TACC2 | UTR5 | 32 | chr10-123923354-123923385 |
| 10 | CPXM2 | exonic | 20 | chr10-125651146-125651165 |
| 10 | NKX6-2 | downstream | 176 | chr10-134598133-134598308 |
| 10 | TLX1NB | intronic | 18 | chr10-102881237-102881254 |
| 12 | IQSEC3 | intronic | 19 | chr12-187057-187075 |
| 13 | PCDH8 | exonic | 4 | chr13-53422171-53422174 |
| 13 | F7 | intronic | 413 | chr13-113764089-113764501 |
| 17 | SOX9 | UTR5 | 19 | chr17-70117397-70117415 |
| 19 | PNMAL2 | exonic | 1237 | chr19-46996868-46998096 |
| 20 | THBD | exonic | 83 | chr20-23028442-23028524 |
| 22 | MAPK8IP2 | exonic | 76 | chr22-51042807-51042882 |
| 22 | KLHDC7B | exonic | 444 | chr22-50986907-50987350 |
| X | GPR143 | exonic | 114 | chrX-9733732-9733845 |
| 11 | IGHMBP2, MRGPRD | intergenic | 914 | chr11-68709935-68710848 |

The degrees of methylation (the value obtained by dividing the methylation level (9%) by 100) of the selected gene regions in normal maternal blood, normal fetal placentas, and Down syndrome fetal placentas are shown in Table 5 below and FIG. 2.

TABLE 5

| Epigenetic Characteristics | Chromosome | Gene | Methylation degree Normal maternal blood | Normal fetal placenta | Down syndrome fetal placenta |
|---|---|---|---|---|---|
| Hyper-methylation | 1 | MXRA8 | 0.12 | 0.42 | 0.78 |
| | 1 | MIB2 | 0.17 | 0.49 | 0.85 |

TABLE 5-continued

| Epigenetic Characteristics | Chromosome | Gene | Methylation degree | | |
|---|---|---|---|---|---|
| | | | Normal maternal blood | Normal fetal placenta | Down syndrome fetal placenta |
| | 1 | KIF26B | 0.16 | 0.37 | 0.79 |
| | 2 | SP5 | 0.08 | 0.31 | 0.79 |
| | 3 | ZIC4 | 0.00 | 0.29 | 0.68 |
| | 4 | ENPEP, PITX2 | 0.03 | 0.45 | 0.74 |
| | 4 | SH3BP2 | 0.02 | 0.33 | 0.71 |
| | 5 | SEPP1, FLJ32255 | 0.01 | 0.33 | 0.70 |
| | | | 0.08 | 0.40 | 0.77 |
| | 5 | SHROOM1 | 0.05 | 0.30 | 0.70 |
| | | | 0.07 | 0.34 | 0.73 |
| | 6 | LINC00574, LOC154449 | 0.13 | 0.34 | 0.77 |
| | 7 | PRRT4 | 0.09 | 0.19 | 0.67 |
| | 7 | TMEM176B | 0.03 | 0.29 | 0.73 |
| | 7 | MNX1 | 0.00 | 0.12 | 0.61 |
| | 9 | LOC101928483, EGFL7 | 0.21 | 0.31 | 0.80 |
| | 9 | NACC2, C9orf69 | 0.00 | 0.39 | 0.70 |
| Hyper-methylation | 10 | TLX1 | 0.02 | 0.36 | 0.72 |
| | 10 | FGF8 | 0.03 | 0.22 | 0.70 |
| | 10 | TACC2 | 0.02 | 0.26 | 0.66 |
| | 10 | CPXM2 | 0.01 | 0.51 | 0.79 |
| | 10 | NKX6-2 | 0.05 | 0.28 | 0.69 |
| | 10 | TLX1NB | 0.01 | 0.36 | 0.71 |
| | 12 | IQSEC3 | 0.03 | 0.18 | 0.64 |
| | 13 | PCDH8 | 0.10 | 0.31 | 0.77 |
| | 13 | F7 | 0.06 | 0.24 | 0.68 |
| | 17 | SOX9 | 0.03 | 0.25 | 0.64 |
| | 19 | PNMAL2 | 0.03 | 0.42 | 0.78 |
| | 20 | THBD | 0.21 | 0.39 | 0.83 |
| | 22 | MAPK8IP2 | 0.14 | 0.27 | 0.73 |
| | 22 | KLHDC7B | 0.03 | 0.55 | 0.84 |
| | X | GPR143 | 0.13 | 0.33 | 0.73 |
| Hypo-methylation | 11 | IGHMBP2, MRGPRD | 0.81 | 0.78 | 0.14 |

A difference in methylation levels between normal fetal placentas and maternal blood cells, and a difference in methylation levels between Down syndrome fetal placentas and normal fetal placentas were compared.

Figure 2:
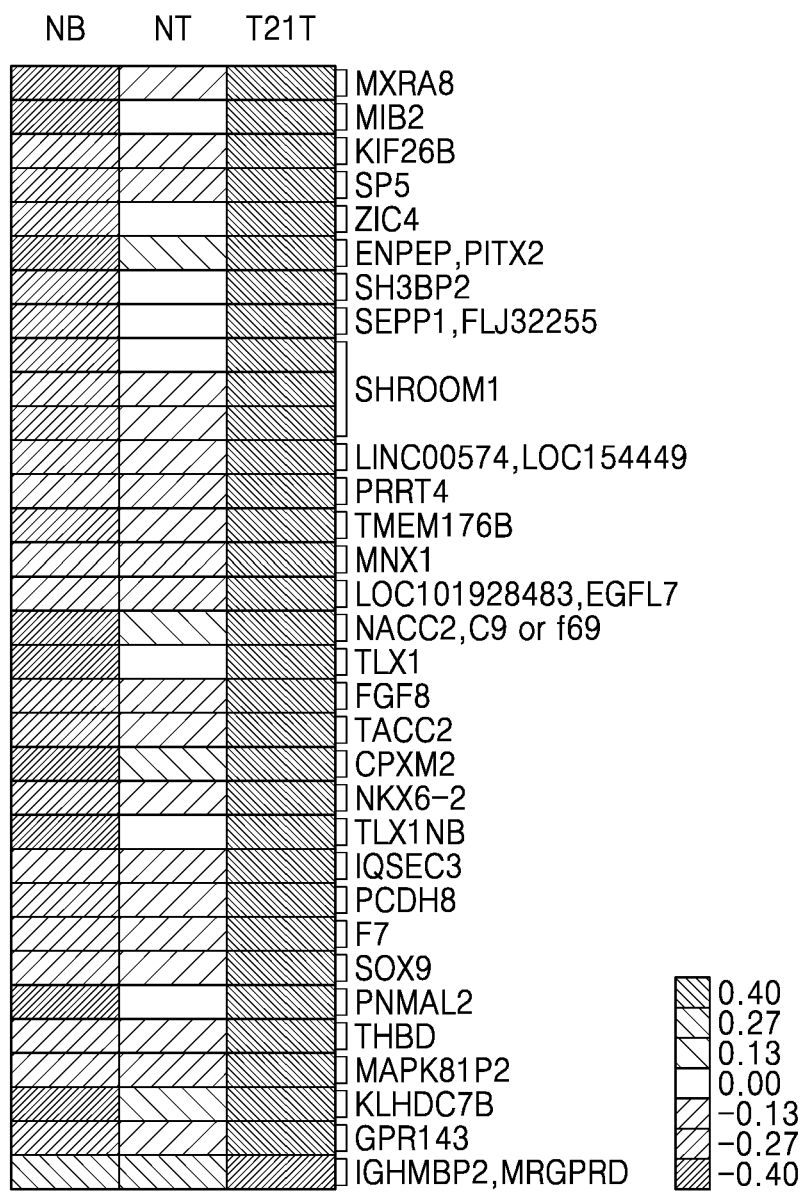
FIG. 2 shows results of comparing methylation levels among 33 biomarker groups through analysis of methylation levels of a genome for the normal maternal blood (NB), the normal fetal placental tissue (NT), and the Down syndrome fetal placental tissue (T21T).

As a result, as shown in Table 5 and FIG. 2, it was confirmed that the MXRA8, MIB2, KIF26B, SP5, ZIC4, ENPEP, PITX2, SH3BP2, SEPP1, FLJ32255, SHROOM1, LINC00574, LOC154449, PRRT4, TMEM176B, MNX1, EGFL7, LOC101928483, NACC2, C9orf69, TLX1, FGF8, TACC2, CPXM2, NKX6-2, TLX1NB, IQSEC3, PCDH8, F7, SOX9, PNMAL2, THBD, MAPK81P2, KLHDC7B, and GPR143 gene regions were hyper-methylated in the fetal placentas, particularly in Down syndrome fetal placentas. Specifically, the difference in methylation levels of the genes between the normal fetal placentas and maternal blood cells was 10 to 50, and the genes were hyper-methylated in the fetal placentas compared to the maternal blood, and thus, the genes were confirmed to be tissue (placenta)-specific biomarkers. In addition, the difference in methylation levels of the genes between the Down syndrome fetal placentas and normal fetal placentas was 25 to 50, confirming that the genes are disease (Down syndrome)-specific biomarkers hyper-methylated in a Down syndrome fetus compared to a normal fetus. Differences in the methylation levels among the Down syndrome fetal placentas and the other two groups (normal fetal placentas and maternal blood) were all statistically significant (P<0.05).

In addition, it was confirmed that the IGHMBP2 and MRGPRD gene regions were hypo-methylated in the Down syndrome fetal placentas. It was confirmed that the methylation levels of the IGHMBP2 and MRGPRD gene regions in normal fetal placentas and maternal blood cells were 75 or more, and hyper-methylated, whereas the methylation levels in Down syndrome fetal placentas were 15 or less, and hypo-methylated. Even in this case, differences in the methylation levels among the Down syndrome fetal placentas and the other two groups (normal fetal placentas and maternal blood) were all statistically significant (P<0.05).

Summarizing the results of Example 4, it may be confirmed that the genes MXRA8, MIB2, KIF26B, SP5, ZIC4, ENPEP, PITX2, SH3BP2, SEPP1, FLJ32255, SHROOM1, LINC00574, LOC154449, PRRT4, TMEM176B, MNX1, EGFL7, LOC101928483, NACC2, C9orf69, TLX1, FGF8, TACC2, CPXM2, NKX6-2, TLX1NB, IQSEC3, PCDH8, F7, SOX9, PNMAL2, THBD, MAPK81P2, KLHDC7B, and GPR143; and CHODL, NCAM2, CYYR1, GRIK1, OLIG2, CLIC6, SIM2, HLCS, MX2, MX1, TMPRSS2, SLC37A1, PDE9A, CBS, CRYAA, C21orf2, TRPM2, TSPEAR, LINC00162, SSR4P1, SLC19A1, LOC100129027, MCM3AP, YBEY, PRMT2, and ITSN1 In chromosome 21 may be biomarkers that exhibit significant epigenetic characteristics in Down syndrome fetuses compared to the mother and normal fetuses.

Specifically, the DNA methylation level of the Down syndrome-specific biomarkers present on chromosome 21 is "normal maternal blood:normal fetal placenta:Down syndrome fetal placenta=0 to 10:20:40", and the difference of methylation levels according to the disease is about 20%, and when an increase rate (1.5 times) of the numbers of the target chromosome 21 is reflected, it may be confirmed that the final difference in the methylation levels is about 30%.

In addition, the DNA methylation levels of Down syndrome-specific biomarkers present on other chromosomes except for chromosome 21 Is "normal maternal blood: normal fetal placenta:Down syndrome fetal placenta=0 to 10:30:70", and it may be confirmed that a difference in the methylation degree according to the disease is about 40%.

That is, through the above results, it is possible to confirm a specific standard that may be compared with the methylation levels of the mother or normal fetus, which may be used to diagnose a Down syndrome fetus by measuring DNA methylation levels of the biomarker genes.

The invention claimed is:

1. A kit for diagnosing Down syndrome, the kit comprising:
   (i) a substrate comprising (a) immobilized probes that specifically hybridize to at least one SHROOM1 location selected from the group consisting of chr5:132158665-132158747 and chr5:132158969-132158984 with respect to the UCSC hg19 reference genome, and (b) immobilized probes that hybridize to a quantitative control gene,
   wherein the substrate is coated with an active group selected from the group consisting of amino-silane, poly-L-lysine, and aldehyde, and the substrate is at least one selected from the group consisting of slide glass, plastic, metal, silicon, nylon membrane, and nitrocellulose membrane;
   (ii) at least one methylation specific restriction enzyme; and
   (iii) one or more primer sets for amplifying at least one SHROOM1 location selected from the group consisting of chr5-132158665-132158747 and chr5-132158969-132158984 with respect to the UCSC hg19 reference genome.

* * * * *